United States Patent [19]
Field et al.

[11] 3,872,045
[45] Mar. 18, 1975

[54] FLUORINATED EPOXY RESINS CONTAINING POLYTETRAFLUOROALKYLENE FILLERS

[75] Inventors: Donald E. Field, Falls Church, Va.; James R. Griffith, Riverdale Heights, Md.

[73] Assignee: The United States of America as represented by the Secretary of the Navy, Washington, D.C.

[22] Filed: Aug. 22, 1973

[21] Appl. No.: 390,673

[52] U.S. Cl.......... 260/31.2 R, 117/128.4, 117/161, 260/2 BP, 260/2 EP, 260/32.8 EP, 260/33.6 F, 260/37 EP, 260/47 EP, 260/47 EN, 260/77.5 AP, 260/830, 260/836, 260/837, 260/611 A, 260/618 D
[51] Int. Cl... C08g 30/14, C08g 45/04, C08g 51/02
[58] Field of Search............ 260/47 EN, 2 EP, 2 BP, 260/77.5 AP, 618 D, 611 A, 37 EP, 32.8 EP, 31.2 R, 33.6 F, 830, 836, 837, 47 EP

[56] References Cited
UNITED STATES PATENTS

| | | | |
|---|---|---|---|
| 3,475,384 | 10/1969 | Treschler | 260/77.5 AP |
| 3,489,813 | 1/1970 | Dewhirst | 260/2 EP |
| 3,591,547 | 7/1971 | Boudakin | 260/77.5 AP |
| 3,706,772 | 12/1972 | Reines | 260/618 D |
| 3,707,483 | 12/1972 | Reines | 260/2 EP |

OTHER PUBLICATIONS

Lee & Neirlh, Handbook of Epoxy Resins, page 15-11 and 15-13.

*Primary Examiner*—M. J. Welsh
*Attorney, Agent, or Firm*—R. S. Sciascia; Arthur L. Branning; Thomas McDonnell

[57] ABSTRACT

Highly fluorinated polymers are synthesized and crosslinked to form fluorinated network polymers. These polymers are formed into paints by dissolving them into a solvent containing a pigment and extending the polymers with fluorinated fillers.

12 Claims, No Drawings

FLUORINATED EPOXY RESINS CONTAINING POLYTETRAFLUOROALKYLENE FILLERS

BACKGROUND OF THE INVENTION

The invention relates to epoxy resins and urethanes useful as coatings, adhesives and laminates. These resins have applications as automobile coatings, aircraft windshield coatings, ship coatings, and spacecraft coatings. The polymers are highly hydrophobic and can be used as coatings for automobiles which will greatly reduce the need for waxing.

SUMMARY OF THE INVENTION

Fluorinated polymers are produced by reacting one or more fluorinated diols with epichlorohydrin and NaOH. By this process copolymers of the polyol type and the epoxy-terminated type are obtained. These copolymers are formed into paints by the addition of pigments, extenders and/or fillers. Highly hydrophobic paints are produced by using fluoropolymers as extenders.

THE INVENTION

The invention relates to the production of paints from polymers disclosed in our copending application Ser. No. 373,322 filed June 25, 1973, which is hereby incorporated by reference. In that application a new class of prepolymers was disclosed. The prepolymers could be used as coatings or they could be crosslinked to provide further polymers. The prepolymer may be of low molecular weight wherein its terminal epoxy groups are significant or it may be of a higher molecular weight having such a great number of hydroxyl groups that the terminal epoxies are of little significance.

The former is a polymer comprising the formula:

(1) 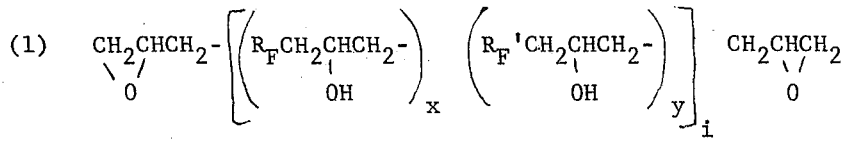

where $i$ is an integer less than 10.

The latter comprises units represented by the following formula recurring more than nine times:

(2) 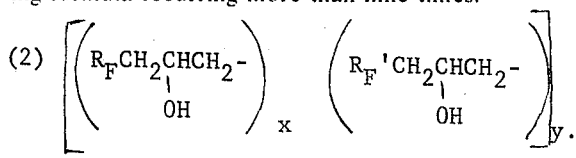

$R_F$ may be either

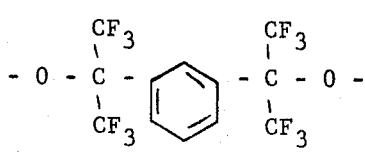

or

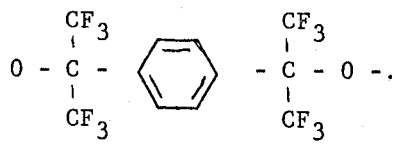

$R_F'$ is an aliphatic fluorocarbon, $-OCH_2(CF_2)_zC-H_2O-$, $z$ being an integer from 2 to 12. Both $R_F$ and $R_F'$ may occur in the unit as many as four consecutive times in their respective positions or $R_F'$ may be absent from the unit entirely. Hence $x$ is an integer from 1 to 4 and $y$ is an integer from 0 to 4. The prepolymers are random copolymers so that in each successive unit $x$ and $y$ may be a different number from the $x$ and $y$ in the previous unit and $y$ will never be 0 throughout the formula. It must also be pointed out that $x$ will seldom equal $y$.

The polyol prepolymer (2) is prepared by reacting two fluorinated diols with epichlorohydrin. Generally, the following reaction scheme is used to produce the prepolymer polyol:

(A) 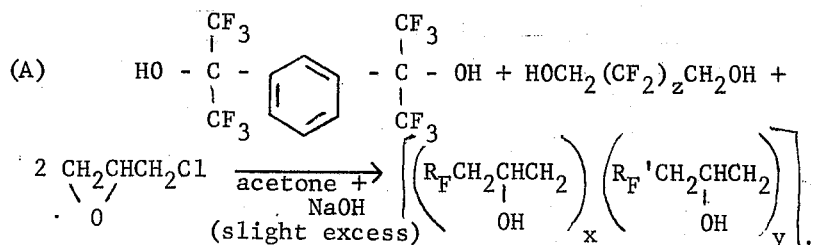

The epoxy terminated prepolymer (1) is synthesized in a somewhat different manner than the polyol prepolymer (2). These prepolymers are synthesized via reaction (A) except that an excess epichlorohydrin is used to form terminal epoxy groups on the polymeric chain. These polymers are usually viscous liquids at room temperature since the chain length will be shorter than when a stoichiometric amount of epichlorohydrin is used.

Examples of polymers produced according to the invention via reaction A can be found in Ser. No. 373,322.

Paints can be made from the foregoing fluorinated polymers by dissolving the polymers in suitable solvents and then dispensing by proper means in this solution suitable pigments and extenders or fillers. Typical solvents are esters, i.e. butyl acetate and amyl acetate, ketones, i.e. methyl ethyl ketone and methyl isobutyl ketone, and aromatic hydrocarbons, i.e. xylene and tolyene. Paints have been defined as colored mixtures, usually liquids, with which suitable surfaces can be coated by brush or other means; the covering formed may be dull or lustrous and acts as a protective and preservative of the surface beneath it. The pigment, while usually an inorganic substance, may be a pure insoluble organic dye, organic dye precipitated on an inorganic carrier or contain metals. The pigment extenders or fillers act to reduce the cost of the paint, improve consistency, leveling, and pigment settling in the paint. Certain extenders reinforce the structure of the dry coating mechanically, while other increase its resistance to the transmission of moisture. The pigments and extenders are added to hide and/or protect the surface beneath the paint. They often perform other important functions such as reflecting the destructive light rays.

Pigments useful in the present invention are titanium dioxide, phthalocyanine blue, carbon black and aluminum flake. Other pigments which may be used are the white hiding pigments, such as basic carbonate white lead, basic silicate white lead, basic sulfate white lead, zinc oxide, leaded zinc oxide, antimony oxide and lithopone. Extender pigments can be used as well. Among these are the hydrated aluminum silicates, magnesium silicate (talc), silica, calcium carbonate, barium sulfate, calcium sulfate and powdered mica. Should color be desired the color pigments may be used. These are classified as natural pigments, synthetic inorganic pigments and synthetic organic pigments.

The natural pigments comprise the inorganic earth colors or mined products and a few organic materials of vegetable and animal origin. Of chief importance are the iron compounds, composed mainly of iron oxides in combination with siliceous material and smaller percentages of the oxides of manganese, aluminum, calcium, and/or magnesium, together with some carbonaceous matter. These ferro-ferric oxide pigments include the yellow ochers, the dark yellow siennas, the brown umbers, the red hematites and burnt siennas, and the black magnetite or magnetic oxide.

The synthetic inorganic pigments contemplated are the iron oxides, iron blues such as ferric-ferrocyanides, chromate pigments, chrome greens, chromium oxides and their hydrates, ultramarine blue, and cadmium yellows and reds.

The synthetic organic pigments are the copper phthalocyanine blues and greens, toludine reds, para reds, lithol reds, yellows, benzidine yellows, tungstated and molybdated pigments.

An important group of pigments are those used entirely for their ability to inhibit metallic corrosion. These include red lead ($Pb_3O_4$), sublimed blue lead (basic lead sulfate, blue), calcium plumbate, basic lead chromate, zinc chromate (zinc yellow), zinc tetroxychromate, and strontium chromate. Unique among the rust-inhibiting pigments is a recently marketed basic lead silico-chromate pigment consisting of a shell of basic lead chromate fused to an inert core of silica.

Metallic pigments for use in paints are usually in flake form. A useful metallic pigment is aluminum. Metallic copper and its alloys with aluminum tin or zinc yield a bronze finish. Zinc dust is useful as gold and silver flake and stainless steel flake.

The invention further contemplates the use of black pigments and fluorescent pigments. When the pigments and extenders are properly dispersed in solutions of the resins and compounded with crosslinking agents such as certain polyisocyanates, such as toluene diisocyanate, hexamethylene diisocyanate and derivatives thereof, or polyamines, such as diethylene triamine, a paint is formed which can be applied to a surface by brush, spray gun or roller. A catalyst such as metal soaps, amines and other organometallics may be added also.

In addition it has been found that the surface tension of these polymers is equal to or less than that of certain other fluoropolymers such as polytetrafluoroethylene (TFE), and fluorinated ethylene-propylene copolymer (FEP) which are manufactured in large volumes in pigment and extender partical size. This means that the foregoing prepolymers can be made into paint containing FEP and TFE as pigment and/or extenders which are completely wetted by the prepolymer. Powdered TFE and FEP can be added in a broad range of quantities. TFE has been added from 0 to 75% by volume. The 70 volume percent loading of TFE in the fluorinated vehicle had a type "A-2" Durometer hardness of 68. It appears that any amount short of 100 volume percent of the TFE and FEP extender could be added.

Thus, the paints contemplated are produced by dissolving the prepolymer in a solvent. It is estimated that at least 35 weight percent solvent is required to produce a flowable solution. Above 65 weight percent solvent will produce a watery paint. Thus the solution formed should consist from 35% to 65% solvent. The amount of pigment required depends upon the hiding power desired which in turn depends upon the particular use contemplated. The determination as to the quantity of pigment is well within the skill of the art. The crosslinking agent required is roughly stoichiometrically equal to that amount of polymer present. And as stated above anything short of 100% FEP or TFE may be used as a fluorinated polymeric extender.

To illustrate the production of paints from the prepolymers the following examples are presented in which the ingredients used are defined as follows:

| Solvent Combination I | 20% | by volume ethyl acetate |
| | 20% | by volume methyl isobutyl ketone |
| | 60% | by volume ethylene glycol monoethyl ether acetate |

Polymer I —

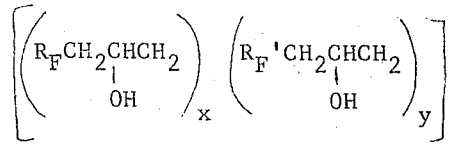

Polymer II — Polymer I wherein $y = 0$.
Polymer III —

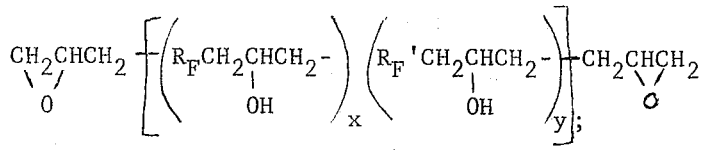

$R_F$, $R_F'$, $i$, $x$, $y$ and $z$ have the same definition as used above, $z$ being equal to 3.

EXAMPLE I

In a pebble mill were placed the following ingredients:

288 gm of a 50/50 by weight solution of polymer I and solvent combination I;
40 gm TFE (3–8 microns);
80 gm Titanium dioxide (0.2–0.4 microns);
30 gm phthalocyanine blue (<2 microns).

This mixture was milled for 72 hours, removed from the mill and then stirred into it was the following:

98 gm of a solution of 75% solids of a biuret formed
         by the reaction of 3 moles hexamethylene diiso-
         cyanate and 1 mole of water known as "Desmodur N"
         and having 16.3–17.0% NCO groups;
    38 gm of a solution of 0.17 gm dibutyl tin dilaurate
         in 95 gm of solvent combination I.

Solvent combination I was added to achieve a spraying viscosity and applied to a suitable substrate. This paint when dry and hard was a medium blue color with a 60° angle gloss of 76%. After 4 months exposure at 45° south in Washington, D.C. the reflectance was 73%.

EXAMPLE II

The procedure of Example I was repeated in which polymer II was substituted for polymer I. 0.80 grams of carbon black was substituted for the phthalocyanine blue. When dry and hard this paint was light gray in color with 60° angle gloss of 86%. After 4 months exposure at 45° south in Washington, D.C. the reflectance was 85%.

EXAMPLE III

In a steel ball mill were placed:

200 gm of Polymer III;
    100 gm Straotium Chromate pigment;
     50 gm solvent combination I; and
     50 gm resorcinol diglycidyl ether.

Milled for 48 hours, removed from mill and 30 gm diethylene triamine were added. The paint was thinned for brush or spray application with solvent combination I. This paint makes an excellent primer to aluminum and aluminum alloys for fluorinated paint topcoats such as in Example I and II.

The novel paints can be produced and cured in situ without the use of heat. Due to their highly fluorinated nature and the ability to "wet" TFE and FEP, the paints are highly hydrophobic and organophobic.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A coating comprising a solution of an epoxy - terminated polymer having recurring units of the formula

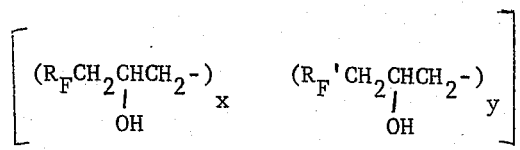

wherein the units recur more than 9 times, $R_F$ is selected from the group consisting of

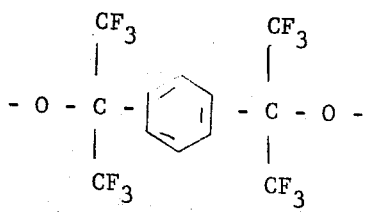

and

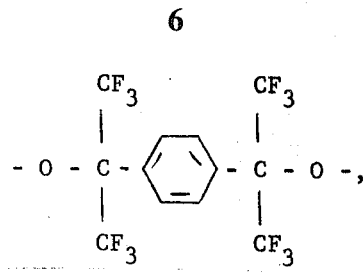

$R_F'$ is $-OCH_2(CF_2)_zCH_2O-$, $z$ being an integer from 2 to 12, $x$ is integer from 1 to 4 and $y$ is an integer from 0 to 4, and a solvent in an amount from 35 to 65 weight percent of total composition;

said solution being mixed with a fluorinated polymeric extender, a pigment and a crosslinking agent.

2. A coating according to claim 1 wherein said crosslinking agent is selected from the group consisting of hexamethylene diisocyanate, toluene diisocyanate, and derivatives thereof.

3. A coating according to claim 1 wherein said polymeric extender is selected from the group consisting of polytetrafluoroethylene and fluorinated ethylene-propylene copolymer.

4. A coating according to claim 1 wherein the amount of crosslinking agent present is about stoichiometrically equivalent to the amount of polymer present.

5. A coating comprising a 50% by weight solution of an epoxy-terminated polymer of the formula

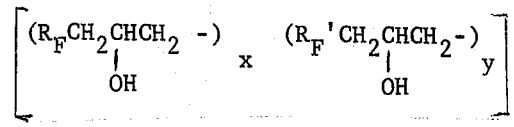

wherein the unit recurs more than 9 times, $R_F$ is selected from the group consisting of

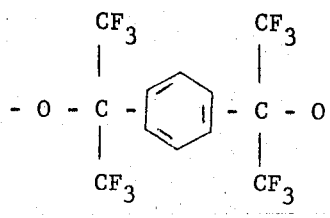

and

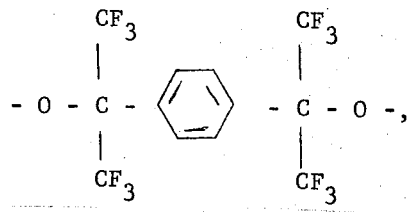

$R_F'$ is $-OCH_2(CF_2)_zCH_2O-$, $z$ being an integer from 2 to 12, $x$ is an integer from 1 to 4 and $y$ is an integer from 0 to 4, and a solvent;

said solution being mixed with a fluorinated polymeric extender selected from the group consisting of polytetrafluoroethylene and fluorinated ethylene-propylene copolymer, a pigment and a crosslinking agent.

6. A coating according to claim 5 wherein said crosslinking agent is selected from the group consisting of hexamethylene diisocyanate, toluene diisocyanate and derivatives thereof and said crosslinking agent is present in a stoichiometric amount about equal to the amount of polymer present.

7. A coating comprising a solution of a polymer of the formula

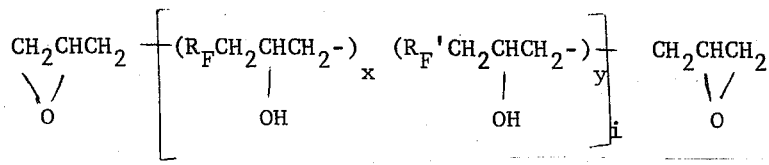

wherein $R_F$ is selected from the group consisting of

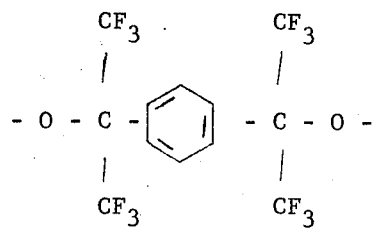

and

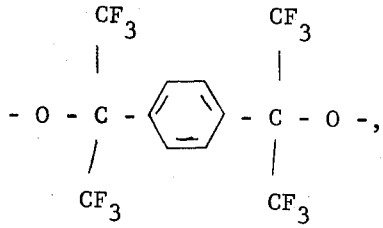

$R'_F$ is $-OCH_2(CF_2)_zCH_2O-$, $z$ being an integer from 2 to 12, $i$ is an integer less than 10, $x$ is an integer from 1 to 4 and $y$ is an integer from 0 to 4, and a solvent in an amount from 35 to 65 weight percent of total composition;

said solution being mixed with a pigment, a crosslinking agent and an extender.

8. A coating according to claim 7 wherein said crosslinking agent is diethylene triamine.

9. A coating according to claim 7 wherein said polymeric extender is selected from the group consisting of polytetrafluoroethylene and fluorinated ethylene-propylene copolymer.

10. A coating composition according to claim 7 wherein the amount of crosslinking agent present is about stoichiometrically equivalent to the amount of polymer present.

11. A coating comprising a 50% by weight solution of a polymer of the formula

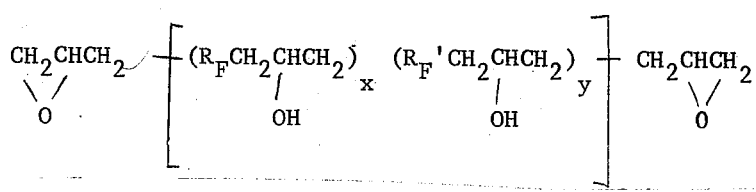

wherein $R_F$ is selected from the group consisting of

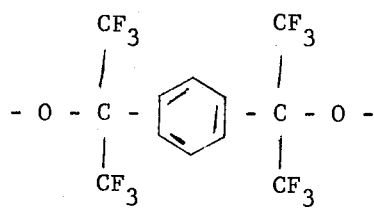

and

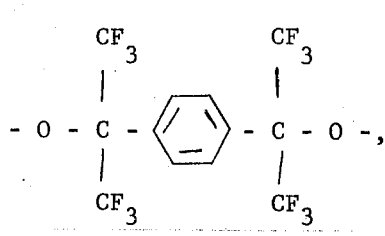

$R_F'$ is $-OCH_2(CF_2)_zCH_2O-$, $z$ being an integer from 2 to 12, $i$ is an integer less than 10, $x$ is an integer from 1 to 4 and $y$ is an integer from 0 to 4, and a solvent;

said solution being mixed with a fluorinated polymeric extender selected from the group consisting of polytetrafluoroethylene and fluorinated ethylene-propylene copolymer, a pigment and a crosslinking agent.

12. A coating according to claim 11 wherein said crosslinking agent is diethylene triamine and is present in an amount about stoichiometrically equivalent to the amount of polymer present.

* * * * *